United States Patent Office 2,928,816
Patented Mar. 15, 1960

2,928,816

PROCESS FOR INCREASING THE EMULSIFIABILITY OF A POLYETHYLENE/ISOPROPANOL TELOMER WAX

Wilbur F. Chapman and John N. Cosby, Morris Township, N.J., assignors to Allied Chemical Corporation, a corporation of New York No Drawing. Application July 26, 1955
Serial No. 524,620

5 Claims. (Cl. 260—94.9)

This invention relates to a novel process for the controlled oxidation of high molecular weight, hard, waxy aliphatic compounds, and to the oxidized product.

The high molecular weight waxes as herein defined, are characterized by high degrees of hardness, toughness, light color, etc., which, except for a primary drawback, adapt them for a multitude of uses, particularly in the coating and impregnation fields. Unfortunately, the majority of such waxes suffer, to greater or lesser extents, from deficiencies in ease of emulsification in water. Since many important wax uses require application of the wax from an aqueous emulsion, such deficiencies are a major deterrent to widespread use of such waxes.

In the application of Michael Erchak, Jr., Serial No. 515,770, filed June 15, 1955, there is disclosed a process for the controlled oxidation of high molecular weight, hard, waxy, essentially polymethylenic compounds having average molecular weights in the range between about 500 and about 3,000, to produce resulting oxidized wax products of increased emulsifiability with a minimum of reduction in their initial desirable hardness, toughness and color characteristics. These results are accomplished in the Erchak process by subjecting such compounds in the liquid phase to the action of an oxygen-containing gas such as air, under such conditions as to produce the reaction of between about ½ pound and about 7 pounds of oxygen per 100 pounds of waxy compound per hour.

A primary object of our invention is to provide hard waxes of good emulsifiability.

Another object of the invention is to provide an improved oxidation process for the oxidation of high molecular weight, hard, waxy aliphatic compounds which produces a hard, waxy product of increased emulsifiability in shorter times than have been possible heretofore, and with the consumption of relatively less oxygen.

A still further object is to provide a controlled oxidation process for the oxidation of hard, waxy aliphatic compounds having molecular weights between about 500 and about 3,000, to provide wax products of increased emulsifiability with virtually no reduction in their initial hardness characteristics, and with an increase in toughness characteristics.

A still further object of the invention is to provide a controlled oxidation process for the oxidation of hard, waxy polymers of ethylene having molecular weights between about 1,000 and about 3,000, whereby a hard, waxy product of increased emulsifiability is produced with virtually no reduction in hardness, and with an increase in toughness characteristics.

A still further object of the invention is to provide a process for increasing the viscosity characteristics of polymethylene waxes having average molecular weights between about 500 and about 3,000.

These and other objects are accomplished according to our invention, wherein normally solid, hard, waxy aliphatic compounds, having molecular weights between about 500 and about 3,000 are subjected, in the liquid phase, after addition thereto of a small quantity of an unsaturated aliphatic polycarboxylic acid having from 4 to 6 carbon atoms and having at least 1 carbonyl group attached to a doubly bound carbon atom, to the action of an oxygen-containing gas, under such conditions of temperature, pressure and quantity of oxygen as to produce the reaction of between about ½ pound and about 7 pounds of oxygen per 100 pounds of waxy compound per hour.

The preferred unsaturated acids for use in our invention are maleic acid or anhydride and fumaric acid. Other acids which may be used include mesaconic, citraconic, glutaconic, itaconic, muconic and the aconitic acids and also the anhydrides of such of the above acids as form anhydrides. Whenever, in the specification and claims herein, the term "acid" is used in referring to the above compounds, it is to be understood as including the anhydrides of such of the acids as form anhydrides.

The quantity of unsaturated acid used is not unduly critical, small quantities within the range between about 1% and about 3%, based on the weight of the wax oxidized, usually being sufficient.

Proceeding at the critical reaction rates, not only is good emulsifiability obtained in relatively much shorter periods, and with consumptions of significantly less oxygen than are necessary when oxidation is carried out in the absence of unsaturated acid, but the resulting products have superior hardness characteristics, often being harder than the starting wax materials, and moreover have surprisingly enhanced toughness characteristics as reflected in a substantial increase in viscosity.

In carrying out the process according to our invention, high molecular weight wax as defined, is charged to an insulated pressure vessel equipped for application of heat, preferably after first melting the wax. The unsaturated acid or anhydride is added, conveniently in solid form, to the molten wax and is thoroughly incorporated therein. If desired, the oxidizer may be placed under pressure prior to the addition of the wax, the pressure in such case being somewhat below the reaction pressure. The oxidizer is then heated to reaction temperature, and an oxygen-containing gas is brought into contact with the hot, liquid wax at the desired rate of flow. The pressure is brought to the desired reaction pressure and at this point venting of unreacted gas is initiated, and continued in such a manner as to maintain the desired pressure. When the desired degree of oxidation has been effected, influx of oxygen-containing gas is discontinued, and the resulting oxidized wax is discharged from the oxidizer.

While, under the conditions of oxidation according to our invention, very little, if any, degradation of the wax to volatile non-waxy materials takes place, it nevertheless may be desirable to subject the oxidized wax to a purification and deodorization treatment to remove such minor quantities of decomposition products as may have formed and to remove unreacted unsaturated acid. This purification may conveniently be accomplished by blowing the molten wax with an inert gas, such as steam, nitrogen, carbon dioxide or air. If air is used, the blowing should be carried out at temperatures not exceeding about 135° C., since virtually no oxidation of the wax takes place at or below this temperature.

Rate of oxidation is determined largely by conditions of temperature, pressure and flow of oxygen-containing gas, and these are so correlated that the rate of oxygen reaction with the waxy material is at least about ½ pound of oxygen per 100 pounds of waxy material per hour, and not more than about 7 pounds of oxygen per 100 pounds of wax per hour. Satisfactory enhancement of the emulsifiability of the waxes can usually be obtained by the reaction of a total of between about ½ pound and about 6 pounds of oxygen per 100 pounds of wax in limited times, ranging from about ¾ hour to about 5 hours, without substantial degradation or cleavage of the wax molecule and with virtually no diminution of the hardness of the treated wax, coupled with an increase in its viscosity and toughness characteristics. Usually reaction times between about 1 hour and about 3 hours will be sufficient. Suitable temperatures for carrying out our oxidation process are within the range between about 135° C. and about 175° C., while pressures between about 50 p.s.i.g. and about 1,000 pounds per square inch gauge are used to effect oxidation at the relatively low temperatures indicated. Preferably, pressures between about 200 p.s.i.g. and about 800 p.s.i.g. will be used. Temperatures below about 135° C. result in little, if any, oxidation, even at the indicated pressures and over extended periods. Temperatures in excess of about 175° C. so increase the reaction rate that the reaction becomes autocatalytic and is difficult or impossible to control, producing rapid, destructive oxidation of the wax, and consequent reduction of the desirable characteristics of the wax, including some diminution in its hardness and uniformity. The use of pressures within the indicated range permits a high rate of oxidation without subjecting the wax to high temperatures or to long periods at intermediate temperatures.

Suitable starting materials adapted for oxidation according to the process of our invention include the normally solid, hard, waxy, essentially polymethylenic compounds having molecular weights in the range between about 500 and about 3,000 and having initial hardness characteristics exhibiting penetrations below about 0.7 mm. as measured by the standard ASTM penetration test, D-5-25, i.e., using 100 grams, 5 seconds, 77° F. Waxes of molecular weight lower than about 500, such as the paraffins, etc. are usually sufficiently emulsifiable without oxidation but also do not usually have the high hardness characteristics suited for the uses for which the hard waxes of the present invention are adapted. Materials having molecular weights appreciably above 3,000 do not produce sufficiently fluid reaction media under reaction conditions and hence are unsuited for treatment according to the process of the invention. Suitable starting material waxes as above defined usually have viscosity characteristics as measured in seconds by the Standard Saybolt Furol test at 140° C. (ASTM-88-44) between about 10 and about 1,000 seconds, and melting points between about 160° F. and about 240° F.

As starting materials we may use any of the essentially polymethylenic waxes such as a polymerized ethylene having average molecular weight and hardness characteristics within the indicated ranges, either in strictly hydrocarbon form or in the form of a "telomer," i.e., a polyethylene wax having a terminal residue on the polyethylene chain, resulting from polymerization of ethylene in the presence of a co-reactant. Thus, particularly suitable for oxidation according to the process of our invention to produce products of outstanding utility in the fields of emulsifiable waxes, i.e., in floor polishes, textile and paper coatings, coating and impregnation of asbestos shingles, etc., are the waxy polymers of ethylene having molecular weights between about 1,000 and about 3,000, and penetrations as above defined of not more than about 0.7 mm., usually between about 0.1 and about 0.3 mm. Suitable ethylene polymers may be prepared by subjecting the ethylene, either alone or in the presence of a co-reactant, to temperatures between about 150° C. and about 300° C. and at pressures ranging from about 500 p.s.i. to about 7,000 p.s.i. If a co-reactant is used, it may be, for example, a normally liquid organic compound free of olefinic unsaturation, e.g., consisting of carbon, hydrogen and oxygen or carbon, hydrogen and halogen, for example, an alcohol such as isopropanol, an ester, e.g., methyl propionate, a ketone such as acetone, an ether, an alkane, an alkyl benzene, etc.

When ethylene is thus polymerized in the presence of a co-reactant, for example, as disclosed in U.S. Patents 2,683,141 and 2,504,400, of Michael Erchak, Jr. a "telomer" is formed having a structure which is essentially polyethylenic and containing as a terminal addition to its polyethylene chain, a radical of the co-reactant. Such polyethylene waxes, containing an alcohol group in their structure, will be referred to herein as polyethylene/alcohol telomers and by this term is meant waxes prepared by polymerizing ethylene under wax-forming conditions in the presence of a liquid aliphatic alcohol having from 1 to 10 carbon atoms inclusive. For example, when ethylene is polymerized in the vapor phase in the presence of isopropanol vapor under the conditions indicated above, the structure of the resulting waxes may be essentially as written below:

$$CH_3(CH_2-CH_2)_nC(OH)(CH_3)_2$$

where "$n$" is an interger and the waxes are a mixture of individual homologs having varying values for "$n$" in the range of about 30 to about 150. Such polyethylene telomer waxes are thus characterized by a recurring —$CH_2$— group, i.e., they are essentially polymethylenic in structure. They may, however, contain a relatively small amount of branching, for example, perhaps one $C_4$ branch chain for each 30 linear carbons. Other polyethylenes within the scope of the invention, prepared by other polymerization processes, such as by certain emulsion polymerization techniques, or in the presence of certain catalysts, may have virtually no branching and may possess a completely straight chain structure.

Suitable wax starting materials also include the so-called "Fischer-Tropsch" waxes which are mixtures containing predominantly straight chain hydrocarbons solid at normal room temperature and resulting from the reaction of carbon monoxide and hydrogen according to the well-known "Fischer-Tropsch" synthesis, and having an essentially polymethylenic structure, usually with little or no branching. These waxes may have widely varying average molecular weights. Suitable waxes of this type have molecular weight and hardness characteristics within the ranges indicated above.

Thus the waxes suitable for use in our process are the essentially polymethylenic compounds, i.e., those characterized by the presence of a recurring —$CH_2$— group, from whatever source, having the molecular weight and hardness characteristics as defined above. Mixtures of various waxes of this character may also be used.

The waxy aliphatic compounds within the purview of our invention have melting point characteristics such that they are solids at normal room temperatures, i.e. 20° C.–25° C., but are liquids within the range of reaction temperatures and pressures employed in the oxidation process. They also have viscosity characteristics under such reaction conditions, which render them sufficiently fluid to permit adequate distribution of oxygen-containing gas throughout the liquid mass to obtain the critical oxidation rate specified by conventional means widely employed for aerating liquids. Thus, suitable flow and distribution of oxygen-containing gas throughout the liquid wax may be obtained by passing the gas into the wax through any of the usual devices, such as a pipe inlet or a conventional sparger to produce adequate distribution of oxygen-containing gas within the liquid. Contact of gas with the liquid is not unduly critical so long as the quantity present and its distribution within the liquid are sufficient to insure the desired critical rate of reaction with the wax. Suitable flow rate and means of distribution will vary, of course, with the design and size of the equipment used, etc. In general, flow rates between about ½ cubic foot/minute and about 7 cubic feet/minute have been found satisfactory for use in a reactor 3 inches in diameter by 20 feet in height charged with about 25 to 35 pounds of wax.

Any suitable oxygen-containing gas may be used to provide oxygen for the oxidation, preferably a mixture of oxygen with an inert gas, such as nitrogen, carbon dioxide, etc. While oxygen alone might be used, it would tend to increase the reaction rate unduly producing local over-oxidation resulting in a non-uniform product. Accordingly, we prefer to use an oxygen-containing gas, containing not more than about 50%, for example, between about 5 and about 50% oxygen by volume, the balance being an inert gas. We prefer to use air, an approximately 20% oxygen mixture, because of its availability.

The oxidation time, within the critical rates specified, will be sufficient to produce a product having acceptable water-emulsifiability characteristics. This time is readily determined by withdrawing a sample of wax and testing it for emulsifiability in a standard test formulation. Longer reaction times result in a larger amount of oxygen reacted and produce waxes which are somewhat darker than those produced at shorter oxidation times. Addition of small amounts of unsaturated acids as specified, produce harder and significantly tougher but slightly darker products than are produced in the absence of such acids and yield products of good emulsifiability in shorter reaction times and also lower total oxygen absorptions than are required in their absence.

The exact mechanism of the reaction according to our invention is not clear. The oxidation process, however, adds carboxylic acid groups to the large aliphatic molecules of the waxes, while the unsaturated acid joins the molecule in some way not entirely clear to contribute additional carboxylic acid groups and perhaps a few ester groups. However, in most cases, the saponification number (which measures both acid and ester groups) is substantially identical to or only slightly greater than the acid number (which measures only acid groups) so that our products all have an extremely low or zero ester number (saponification number minus acid number) and have ratios of saponification number to acid number usually of about 1 to about 1.2, and not more than about 1.5.

One of the primary advantages of our invention is that it permits modification of the hard non-emulsifiable waxes in such a manner as to render them readily emulsifiable with virtually no diminution in their hardness characteristics. "Hard" waxes as this term is used in the trade, are those waxes having penetration values according to the standard ASTM penetration test, designated D–5–25, of not more than about 1.5 mm. In this test, a standard needle under a 100 gram load is brought to bear for a period of 5 seconds upon the surface of the wax, held at 77° F. The harder the wax the less the degree of penetration of the needle. When oxidized according to the process of our invention, such waxes are rendered readily emulsifiable with a decrease in hardness amounting to not more than about 0.1 mm. in the above hardness scale, often exhibiting an increase in hardness, particularly when maleic anhydride is the unsaturated acid used.

For many hard wax uses, a high degree of toughness is advantageous. This characteristic is especially useful in waxes for floor and wire coatings, textile, paper and other coatings which are subjected to pressure or impact stresses. This characteristic is woefully lacking in most of the commonly available hard waxes, including carnauba wax. Such waxes are extremely brittle, and tend to crack and break when subjected to such stresses.

The oxidation process according to our invention markedly increases the toughness characteristics of the waxes oxidized, yielding hard, emulsifiable waxes having unusual advantages for such uses. This enhancement in toughness yields particularly valuable products in the case of the hard polyethylene waxes by rendering an initially tough wax even tougher and stronger, and thus adapted for use under severe conditions of pressure and impact stresses.

Enchancement in toughness is indicated by an increase in the viscosity characteristics of the resulting waxes as measured according to standard ASTM test D–88–44, Saybolt Furol seconds at 140° C. Thus, viscosities of the hard polyethylene waxes as defined, which may range initially, for example, from about 150 to about 250 in the above test, are consistently enhanced by oxidation admixed with unsaturated acid, to produce waxes having viscosities up to as high as about 500 or more, whereas the same waxes oxidized in absence of unsaturated acid, yield products of the same or somewhat diminished viscosity characteristics, and are thus significantly less tough than the products of our process. The preferred waxes prepared according to our invention have viscosity characteristics in excess of 250, preferably between about 275 and about 500. Waxes having viscosities appreciably in excess of about 500 are not sufficiently fluent to be easily emulsified by conventional methods.

The color of the hard emulsifiable waxes prepared according to our invention is extremely light in comparison to that of most available hard waxes. As measured by a Union Colorimeter according to ASTM method D–155–45T, the waxes of our invention usually rate not higher than about 4, often less than 1. In general, while oxidation of the waxes with addition of unsaturated acid may produce waxes of slightly darker color than result when the unsaturated acid is omitted, such darkening is only very slight, usually reducing the color no more than 1 to 2 points in the standard scale.

The process of our invention may be carried out in any suitable equipment. In the illustrative examples set forth below, the equipment used consisted of a vertical 3 inch inside diameter insulated steel pipe 20 feet high, closed at each end, having a top outlet valve actuated by a pressure regulator and equipped for heating to initiate the oxidation reaction and for cooling to remove heat of exothermic reaction after its initiation. In carrying out the oxidations in the examples, wax was melted in a separate vessel outside the reactor, in which it was mixed with unsaturated acid, and sufficient melted wax was then flowed into the reactor to fill the reactor about two-thirds full. The pressure regulator was set to maintain the predetermined desired pressure, the charge was heated to reaction temperature, then air under pressure at least sufficient to cause it to rise through the column was metered at the predetermined desired rate to the bottom of the reactor into the liquid wax through a ¼ inch diameter pipe, and became uniformly distributed throughout the liquid wax charge in rising through the column. When pressure in the reactor reached the predetermined value, according to the pressure regulator setting, the automatic pressure control valve at the top opened to permit off gas flow at the rate necessary to maintain the predetermined pressure.

The flow of air was discontinued when the desired amount of oxygen had reacted as indicated by analysis of off gas samples taken at 15 minute intervals. The resulting oxidized wax was then cooled immediately to about 135° C., and withdrawn from the oxidizer to a deodorizer vessel wherein it was blown with air at a temperature between its melting point and 135° C. (virtually no oxidation taking place at these temperatures) for a period of about one hour, at about 4 to 5 cubic feet per minute per 30 pounds of wax. The resulting wax product was drained through several layers of cheese cloth into aluminum pans and allowed to cool and solidify.

Ease of emulsification may be evaluated by the following test. The standard test formulation is given below, consisting, in grams of

| | Grams |
|---|---|
| Oxidized wax | 30 |
| Oleic acid | 6 |
| Morpholine | 6 |
| Water | 138 |

The oxidized wax is melted, and the oleic acid is added. With the melt temperature at 120°–130° C., morpholine is added slowly.

The water is heated to 95–99° C. (just below boiling) in a 400 cc. beaker fitted with a 3 bladed, 2 inch diameter propeller type agitator (Arthur H. Thomas catalog No. 92–40 K), operated by a $\frac{1}{10}$ horse power motor. With the agitator rotating at about 800 r.p.m., the hot melt, at 115–125° C., is added gradually to the hot water during a period of about 2 minutes, in such a manner that the melt stream enters the water at the top of the vortex caused by the stirring action, spiralling down the vortex and being emulsified enroute without accumulation in the vortex. When all the melt has been added to the water, stirring is reduced to about 400 r.p.m., the beaker is covered and its contents allowed to cool to 40–50° C. The emulsion is then weighed, and any weight loss, due to evaporation of water, is compensated by addition of water to restore original weight. The ease of emulsification of the wax was evaluated by the appearance and stability of the resulting emulsion rated as follows:

| Appearance: | Rating ease of emulsification |
|---|---|
| Clear to translucent-stable | Excellent. |
| Translucent-stable | Very good. |
| Milky-fine particles-stable | Good. |
| Milky-coarse particles-stable | Fair. |
| Milky-separates on standing | Poor. |

In general, emulsifiability may be correlated with acid number; waxes having acid numbers of at least about 4, being readily emulsifiable so as to rate "fair" in the above test. Acid numbers of about 7–11 usually rate "good"; those from about 15 to about 20 rating "very good" to "excellent." Different wax uses may require different degrees of emulsifiability, those rating "fair" being adequate for many uses in which the emulsion is to be used soon after its preparation. Emulsions which are to be kept or stored for various lengths of time before use, may require a "good" or higher rating.

The following specific examples further illustrate our invention. Except as otherwise noted, in all the examples, hardness characteristics are shown in terms of penetration as measured by the standard ASTM–D–5–25 test using 5 seconds, 77° F., using the standard 100 grams load; viscosities are measured according to ASTM–D–88–44 Saybolt Furol seconds at 140° C.

EXAMPLES 1–6

A series of oxidations were made using a polyethylene/isopropanol telomer wax having an average molecular weight of about 2,000, hardness characteristics from about 0.15 mm. to about 0.17 mm., and which failed to yield even a "poor" emulsion when evaluated in the above test formula. The wax samples were melted and 2% of solid maleic anhydride, based on the weight of the sample, was added to each wax charge and thoroughly mixed therewith. The mixtures were then subjected to oxidation in the equipment and in the manner generally described above. Conditions used and results of the runs are set forth in Table I, below.

*Table I*

OXIDATIONS OF POLYETHYLENE WAX OF 2,000 AVERAGE MOLECULAR WEIGHT WITH 2% MALEIC ANHYDRIDE ADDED

| Example No. | 1 | 2 | 3 | 4 | 5 | 6 |
|---|---|---|---|---|---|---|
| Temp., ° C. | 150–152 | 144–147 | 145–149 | 150–160 | 150–159 | 150–162 |
| Pressure p.s.i.g. | 500 | 600 | 600 | 500 | 500 | 500 |
| Time, Hours | 1.35 | 2.7 | 2.7 | 1.8 | 1.7 | 1.0 |
| Air Rate, c.f.m. | 4.93 | 3.0 | 3.0 | 4.0 | 3.9 | 4.4 |
| Wax charge, lbs. | 30 | 30 | 30 | 25 | 25 | 25 |
| Maleic Anhydride, lbs. | 0.6 | 0.6 | 0.6 | 0.5 | 0.5 | 0.5 |
| Reaction Rate [1] | 2.9 | 1.5 | 1.6 | 2.9 | 2.6 | 3.1 |
| Results: | | | | | | |
| Initial Penetration, mm | 0.17 | 0.16 | 0.16 | 0.15 | 0.15 | 0.15 |
| Final penetration, mm | 0.15 | 0.20 | 0.21 | 0.22 | 0.22 | 0.16 |
| Initial viscosity | 176 | 240 | 240 | 175 | 175 | 175 |
| Final viscosity | 219 | 430 | 440 | 307 | 278 | 336 |
| Emulsifiability | v.g. | v.g. | v.g. | v.g. | good | good |
| Total $O_2$ reacted/100 lbs. | 3.9 | 4.0 | 4.0 | 5.3 | 4.4 | 3.1 |
| Saponification No. | 17 | 17 | 17 | 20 | 16 | 14 |
| Acid No. | 16 | 17 | 17 | 20 | 16 | 13 |
| Ester Value | 1 | 0 | 0 | 0 | 0 | 1 |

[1] Lb. oxygen reacted/100 lbs. feed wax/hour.

EXAMPLES 7–9

Three oxidations were carried out on samples of polyethylene/isopropanol telomers having average molecular weights of about 2,000, and which failed to yield even a "poor" emulsion when evaluated in the above test formula. The wax samples were melted, and to each was added 2% of solid fumaric acid, based on the weight of the wax sample, and thoroughly mixed therewith. The mixtures were then subjected to oxidation in the equipment and in the manner generally described above. Conditions used and results of the runs are set forth in Table II below.

*Table II*

OXIDATION OF POLYETHYLENE WAX OF 2,000 AVERAGE MOLECULAR WEIGHT WITH 2% FUMARIC ACID ADDED

| Example No. | 7 | 8 | 9 |
|---|---|---|---|
| Temp., ° C. | 150–160 | 150–161 | 150–156 |
| Pressure, p.s.i.g. | 500 | 500 | 500 |
| Time, hours | 1.8 | 1.8 | 1.2 |
| Air rate, c.f.m. | 3.7 | 3.6 | 4.0 |
| Wax charge, lbs. | 25 | 25 | 25 |
| Fumaric Acid, lbs. | 0.5 | 0.5 | 0.5 |
| Reaction Rate [1] | 2.9 | 3.1 | 2.6 |
| Results: | | | |
| Initial penetration, mm | 0.15 | 0.15 | 0.16 |
| Final penetration, mm | 0.25 | 0.24 | 0.21 |
| Initial viscosity | 175 | 175 | 174 |
| Final viscosity | 258 | 232 | 216 |
| Emulsifiability | v.g. | v.g. | v.g. |
| Total $O_2$ reacted/100 lbs. | 5.3 | 5.5 | 3.1 |
| Saponification No. | 24 | 21 | 17 |
| Acid No. | 23 | 21 | 17 |
| Ester value | 1 | 0 | 0 |
| Initial melting point ° C. | 99–101 | 99–101 | -------- |
| Final melting point ° C. | 95–97 | 96–98 | -------- |

[1] Lbs. oxygen reacted/100 lbs. feed wax/hour.

The process of our invention has the advantages over prior oxidation processes of enabling the same degree of emulsifiability to be obtained in a shorter oxidation time and with the absorption of a smaller quantity of oxygen than is required in the absence of unsaturated acid as defined, and in producing products having virtually the same or greater hardness characteristics and of enhanced viscosity or toughness characteristics as compared to the initial values for these characteristics.

The waxes prepared according to our invention form stable translucent emulsions which are easily prepared, and are capable of producing formulations containing high percentages of solids. They are useful, in general, in applications for which hard, emulsifiable waxes are adapted, and particularly for uses in which toughness and resistance to pressure and impact stresses are required.

Thus, they may be used in floor waxes of both paste and emulsion types and in coatings of various types in the asbestos shingle, paper and textile industries, and in coatings and inks for application to various surfaces including glass and metals. They are particularly adapted for use in compositions to be applied to hot surfaces where their high viscosity prevents sagging and dripping prior to setting of the coating. The waxes of the invention may be used in blends with other waxes, notably the soft waxes to improve and upgrade them, or with the hard, brittle waxes to produce products of improved toughness.

While the above describes the preferred embodiments of our invention, it will be understood that departures may be made therefrom within the scope of the specification and claims.

We claim:

1. A process for increasing the emulsifiability as measured by the test described, and viscosity characteristics as measured by standard ASTM test D–88–44, of a polyethylene/isopropanol telomer wax having average molecular weight in the range between about 1,000 and about 3,000 and hardness corresponding to penetration of not more than about 0.7 mm. as measured by the standard ASTM method D–5–25 which comprises incorporating with such wax between about 1% and about 3% of an acidic material selected from the group consisting of unsaturated aliphatic polycarboxylic acids having from 4 to 6 carbon atoms and having at least one carbonyl group attached to a doubly bound carbon atom and anhydrides of such of the aforementioned acids as form anhydrides, subjecting such mixture in the liquid phase to the action of an oxygen-containing gas under such conditions of temperatures between about 135° C. and about 175° C., pressures between about 50 p.s.i.g. and about 1,000 p.s.i.g., correlated as to cause the reaction with the wax mixture of oxygen at the rate of between about ½ pound and about 7 pounds of oxygen per 100 pounds of wax per hour, and continuing the oxidation until between about ½ pound and about 6 pounds of oxygen per 100 pounds of wax have reacted and a saponification number between about 4 and about 24 has been reached.

2. The process according to claim 1 wherein the unsaturated acidic material is maleic anhydride.

3. The process according to claim 1 wherein the unsaturated acid is fumaric acid.

4. The process according to claim 1 wherein the unsaturated acidic material is maleic anhydride, wherein the oxidation is carried out under pressures between about 50 p.s.i.g. and about 800 p.s.i.g. for a period sufficient to produce a saponification number of at least about 4 but not higher than about 24 in the resulting product.

5. The process according to claim 1 wherein the unsaturated acidic material is maleic anhydride, the oxygen-containing gas is air, the oxidation rate is between about 1 pound and about 3 pounds of oxygen per 100 pounds of wax per hour; wherein the oxidation is carried out under pressures between about 200 p.s.i.g. and about 800 p.s.i.g., and in which the oxidation is continued until between about 3 and about 5 pounds of oxygen per 100 pounds of wax have reacted.

References Cited in the file of this patent

UNITED STATES PATENTS

| | | |
|---|---|---|
| 2,486,454 | Zellner | Nov. 1, 1949 |
| 2,504,400 | Erchak | Apr. 18, 1950 |
| 2,683,141 | Erchak | July 6, 1954 |
| 2,674,613 | Nelson | Apr. 6, 1954 |
| 2,766,214 | Erchak et al. | Oct. 9, 1956 |

OTHER REFERENCES

Emulsifiable A-C Polyethylene (about 1953), Allied Chem. and Dye Corp.

"Polythene" (Renfrew and Morgan), published by Iliffe and Sons Ltd. (London, England), 1957 (pages 267 and 280 relied on).